(12) United States Patent
Sexton

(10) Patent No.: US 6,986,954 B2
(45) Date of Patent: Jan. 17, 2006

(54) PERPENDICULAR MAGNETIC RECORDING MEDIA

(75) Inventor: Joseph H. Sexton, Oakdale, MN (US)

(73) Assignee: Imation Corp., Oakdale, MN (US)

( * ) Notice: Subject to any disclaimer, the term of this patent is extended or adjusted under 35 U.S.C. 154(b) by 107 days.

(21) Appl. No.: 10/123,957

(22) Filed: Apr. 17, 2002

(65) Prior Publication Data

US 2003/0198835 A1    Oct. 23, 2003

(51) Int. Cl.
*G11B 5/673*   (2006.01)

(52) U.S. Cl. .................... 428/694 TS; 428/694 TM

(58) Field of Classification Search ............... 428/611, 428/669, 670, 215, 336, 694 TS, 694 TM
See application file for complete search history.

(56) References Cited

U.S. PATENT DOCUMENTS

| | | | |
|---|---|---|---|
| 4,563,715 A | | 1/1986 | Kawamura et al. |
| 5,400,307 A | | 3/1995 | Ochiai et al. |
| 5,660,930 A | * | 8/1997 | Bertero et al. ............... 428/332 |
| 5,693,200 A | | 12/1997 | Tyan et al. |
| 5,738,927 A | * | 4/1998 | Nakamura et al. .......... 428/141 |
| 5,750,270 A | * | 5/1998 | Tang et al. .................. 428/611 |
| 5,783,301 A | * | 7/1998 | Hatwar et al. ............... 428/332 |
| 5,846,648 A | * | 12/1998 | Chen et al. .................. 428/332 |
| 5,851,363 A | | 12/1998 | Miller et al. |
| 5,851,643 A | | 12/1998 | Honda et al. |
| 6,071,609 A | * | 6/2000 | Furutani et al. ............. 428/332 |
| 6,183,893 B1 | | 2/2001 | Futamoto et al. |
| 6,248,416 B1 | * | 6/2001 | Lambeth et al. ............ 428/65.3 |
| 6,266,210 B1 | | 7/2001 | Shiroishi |
| 6,468,670 B1 | | 10/2002 | Ikeda et al. |
| 6,475,611 B1 | | 11/2002 | Chen |
| 6,524,730 B1 | | 2/2003 | Chen |
| 6,534,206 B1 | | 3/2003 | Kirino et al. |
| 6,537,638 B2 | | 3/2003 | Do et al. |
| 6,562,489 B2 | | 5/2003 | Abarra et al. |
| 6,596,418 B2 | | 7/2003 | Maesaka et al. |
| 6,753,072 B1 | * | 6/2004 | Chen et al. .................. 428/216 |
| 6,830,824 B2 | * | 12/2004 | Kikitsu et al. .............. 428/611 |
| 2002/0058161 A1 | * | 5/2002 | Yamamoto et al. ..... 428/694 TS |
| 2002/0177012 A1 | * | 11/2002 | Hikosaka et al. ..... 428/694 TM |
| 2003/0091868 A1 | * | 5/2003 | Shimizu et al. ...... 428/694 TM |
| 2003/0207154 A1 | * | 11/2003 | Shimoda .............. 428/694 ML |
| 2004/0135144 A1 | * | 7/2004 | Yamada et al. ............... 257/59 |

FOREIGN PATENT DOCUMENTS

| | | |
|---|---|---|
| JP | 05-189824 | 7/1993 |
| JP | 6-251441 | 9/1994 |

OTHER PUBLICATIONS

Henley, S., Ashfold, M., and Cherns, D., Surf. Coat. Tech., 177-178, 2004, 271-276.*

(Continued)

*Primary Examiner*—Kevin M. Bernatz
(74) *Attorney, Agent, or Firm*—Eric D. Levinson

(57) ABSTRACT

Perpendicular magnetic media are described for use in magnetic recording and data storage. For example, a magnetic medium may include a substrate, a layer of titanium formed over the substrate, a layer of platinum formed over the layer of titanium, and a multi-layered magnetic stack formed over the layer of platinum. The layer of titanium provides a seed layer to improve the crystal texture of the layer of platinum. The layer of platinum, in turn, provides a seed layer to improve the crystal texture of the multi-layered magnetic stack. In this manner, high perpendicular magnetic anisotropy can be achieved and storage densities can be increased.

23 Claims, 14 Drawing Sheets

OTHER PUBLICATIONS

Peng et al., "Co/Pd and Co/Pt Multilayers with Indium Tin Oxide Seed Layers and NiFe Soft Underlayers for Perpendicular Magnetic Recording Media," IEEE Transactions on Magnetics, vol. 37, No. 4, pp. 1577-1579 (2001).

Ohmori et al., "Low Noise Co/Pd Multilayer Perpendicular Media with Granular Seed Layer," IEEE Transactions on Magnetics, vol. 36, No. 5, pp. 2384-2386 (2000).

Onoue et al., "Improvement of signal to noise ratio for Co/Pd multilayer perpendicular magnetic recording media by the addition of an underlayer," Journal of Magnetism and Magnetic Materials, 235, pp 40-44 (2001).

Osaka et al., "Proposal of Novel Cobalt-Palladium Media Controlled with C or Si Underlayer for Ultra High Density Magnetic Recording," Waseda University, 3-4-1, Okubo, Shinjuku-ku, Tokyo 169-8555 Japan.

Gong, "Development of Highly Oriented Media Structures for Perpendicular Recording," Thesis submitted to the Department of Electrical and Computer Engineering, Carnegie Mellon University, Pittsburgh, Pennsylvania, Sep., 2000.

Radnoczi et al., "Growth Structure of Thin Films for Perpendicular Magnetic Recording Media," Cryst. Res. Technol. 35, pp. 707-711, (2000) 6-7.

Gong et al., "Intergranular Coupling and Grain Isolation of Thin Co Films," Mat. Rec. Soc. Symp. Proc., vol. 517, 223 (1998).

Ohmori et al., "Magnetic properties and noise characteristics of Co/Pd multilayer perpendicular magnetic recording media," Journal of Magnetism and Magnetic Materials, 235, pp. 45-52 (2001).

Sato et al., "Co-Cr-Ta Perpendicular Magnetic Recording Media Using Pt Seed Layer," IEEE Transactions on Magnetics, vol. 36, No. 5, pp. 2387-2389 (2000).

Gong et al., "Highly oriented perpendicular Co-alloy media on Si(111) substrates," Journal of Applied Physics, vol. 85, No. 8, pp. 4699-4701 (1999).

Roy et al., "Seed-layer effect on the microstructure and magnetic properties of Co/Pd multilayers," Journal of Applied Physics, vol. 89, No. 11, pp. 7531-7533 (2001).

Onoue et al., "CoCrPtTa and Co/Pd Perpendicular Magnetic Recording Media with Amorphous Underlayers," IEEE Transactions on Magnetics, vol. 37, No. 4, pp. 1592-1594 (2001).

* cited by examiner

Sample ID: M767-0G

Hc = 3948 Oe

Sample ID: M720-0G

Hc = 5136 Oe

Sample ID: M725-0

Hc = 5239 Oe

Sample ID: M769m6-6p

Hc = 2962 Oe

Sample ID: M768-6G

Hc = 474 Oe

PERPENDICULAR MAGNETIC RECORDING MEDIA

TECHNICAL FIELD

The invention relates to data storage media and, more particularly, perpendicular magnetic media.

BACKGROUND

Many types of magnetic data storage media have been developed to store information. They include magnetic hard drives, magnetic diskettes, magnetic tapes, magnetic tape cartridges, hybrid magnetic media such as magnetic-optical disks, and the like. Increasing data storage density is a paramount goal in the development of new or improved types of magnetic data storage media. Cost reduction is another goal.

Magnetic media generally function according to ferromagnetic principles. For example, the surface of a magnetic medium may be coated with one or more magnetic layers, such as in the form of a multi-layered magnetic stack or a magnetic alloy. The local magnetization of magnetic domains defined on the magnetic layers can be selectively oriented to encode data. The local magnetizations can then be detected and interpreted in order to read the recorded data. A hysteresis curve typically defines how the magnetic domains can be oriented or reoriented in response to application and removal of magnetic fields.

A number of techniques have been developed to increase storage densities and improve quality and reliability of magnetic media. For example, new and improved coatings have been developed over the years in an effort to improve quality and performance of magnetic media. Also, seed layers have been developed to enhance the quality and performance of the subsequently deposited magnetic layers. A seed layer refers to a layer of a magnetic medium that can control or define the crystal texture of subsequently deposited layers. For example, a seed layer may define the crystal phase, and the crystalline orientations of subsequently deposited layers, and may improve the magnetic properties of subsequently deposited layers.

Magnetic media can be categorized as longitudinal or perpendicular. Most conventional magnetic media are longitudinal. In longitudinal media, magnetic anisotropy extends parallel to the plane of the medium. In other words, in longitudinal media, the magnetic orientation of individual magnetic domains is generally parallel to the surface of the medium.

In perpendicular media, on the other hand, magnetic anisotropy is perpendicular to the plane of the medium. In other words, in perpendicular media, the magnetic orientation of individual magnetic domains is perpendicular to the medium surface. Perpendicular media allows for a much higher storage density than can be achieved in longitudinal media. Perpendicular magnetic properties adequate for high density recording are currently achievable with only a limited number of materials.

SUMMARY

In general, the invention is directed to perpendicular magnetic media for use in magnetic recording and data storage. For example, a magnetic medium may include a substrate, a titanium layer formed over the substrate, a platinum layer formed over the titanium layer, and a multi-layered magnetic stack formed over the platinum layer. The individual layers of the multi-layered stack may each have thicknesses less than approximately three nanometers. As described in greater detail below, the titanium layer provides a seed layer to improve the crystal texture of the platinum layer. The platinum layer, in turn, provides a seed layer to improve the crystal texture of the multi-layered magnetic stack. In this manner, high perpendicular magnetic anisotropy can be more readily achieved and storage densities can be increased.

The substrate may comprise glass, plastic, organic resin, metal, or any other suitable substrate material. The described structures and compositions may be particularly advantageous when plastic substrates are used because high temperatures may not be required for their creation, unlike many conventional media. Accordingly, the invention may reduce the cost of media by avoiding high temperature processing and facilitating the use of plastic substrates.

The titanium layer may comprise titanium or a titanium alloy. The titanium layer may define a thickness between approximately 1 and 100 nanometers, preferably between approximately 2 and 50 nanometers, or more preferably between approximately 2 and 40 nanometers. For example, the titanium layer defines a thickness of approximately 10 nanometers. The layer of platinum may comprise platinum or possibly a platinum alloy. The platinum layer may define a thickness between approximately 1 and 20 nanometers, or more specifically between approximately 2 and 10 nanometers.

The multi-layered magnetic stack may comprise pairs of alternating layers of platinum and cobalt. In that case, each of the layers of platinum in the multi-layered stack may define a thickness between approximately 0.5 and 2.5 nanometers, such as a thickness of approximately 1.0 nanometers, and each of the layers of cobalt in the multi-layered stack may define a thickness between approximately 0.15 and 1.0 nanometers, such as a thickness of approximately 0.35 nanometers. The number of pairs of alternating layers of platinum and cobalt may be between 5 and 50 inclusive, or more specifically between 9 and 30 inclusive. For example, 18 pairs of alternating layers of platinum and cobalt may be used. Accordingly, the overall thickness of the multi-layered stack may be in the range of approximately 5 to 50 nanometers.

The layer of titanium may include hexagonal close pack (HCP) crystallites in a (0001) orientation. The layer of platinum may include face centered cubic (FCC) crystallites in a (111) orientation. The multi-layered magnetic stack may comprise pairs of alternating layers of platinum and cobalt including face centered cubic (FCC) crystallites in a (111) orientation. The magnetic recording medium may exhibit a coercivity between approximately 2000 and 10,000 Oersteds. Additionally, the magnetic recording medium may exhibit a hysteresis curve having a switching field distribution (SFD) less than 30 percent of its coercivity, and a nucleation field greater than 80 percent of its coercivity. The medium may exhibit an anisotropy greater than $4.0*10^6$ ergs/cm$^3$.

In another embodiment, the multi-layered magnetic stack may comprise pairs of alternating layers of palladium and cobalt. In that case, the seed layers may comprise a layer of titanium, followed by a seed layer of palladium. The layers of palladium in the multi-layered stack may define a thickness between approximately 0.3 and 1.8 nanometers, and the layers of cobalt in the multi-layered stack may define a thickness between approximately 0.15 and 1.0 nanometers. In particular, the multi-layered magnetic stack may comprise pairs of alternating layers of palladium and cobalt including face centered cubic (FCC) crystallites in a (111) orientation. The number of pairs of alternating layers of palladium and cobalt in the multi-layered stack may be between 5 and 50 inclusive.

In other embodiments, the invention may be directed to a magnetic storage device such as a magnetic tape drive, a magnetic disk drive, a hard disk drive, a floppy disk drive, or a magnetic tape cartridge drive. In any case, the magnetic storage device may include a magnetic storage medium, a head to detect magnetic domains on the medium, a controller that controls a position of the head relative to the medium, and a signal processor that interprets detected magnetic domains. The magnetic storage medium may include a substrate, a layer of titanium formed over the substrate, a layer of platinum formed over the layer of titanium, and a multi-layered magnetic stack formed over the layer of platinum.

The invention may be capable of providing several advantages. For example, perpendicular magnetic media according to the principles of the invention may achieve higher storage densities than conventional longitudinal media. The structures and compositions described below may also provide improved stability against thermal decay relative to some conventional longitudinal and other perpendicular recording media. Also, the invention may provide compatibility with low temperature thin film processes. Low temperature thin film processing, in turn, allow plastic substrates to be used, which may reduce the costs associated with media. The invention can be used to improve the anisotropy, the coercivity, and the crystal texture, including the crystal phase and the crystalline orientation of various layers.

Additional details of these and other embodiments are set forth in the accompanying drawings and the description below. Other features, objects and advantages will become apparent from the description and drawings, and from the claims.

DETAILED DESCRIPTION

The invention is directed to perpendicular magnetic media. Perpendicular magnetic media refers to magnetic media in which anisotropy is perpendicular to the surface of the medium. In contrast, longitudinal media refers to magnetic media in which magnetic anisotropy is generally parallel to the surface of the medium. Perpendicular media allows for a much higher storage density than can be achieved in longitudinal media. In accordance with the invention, a perpendicular magnetic medium is described that includes a multi-layered magnetic stack having anisotropy that is perpendicular to the surface of the medium.

In this disclosure, the term multi-layered stack refers to a collection of layers each having individual layer thicknesses of less than approximately 3 nanometers. Such a multi-layered stack is sometimes referred to as a nanolayered stack. For example, the multi-layered stack may comprise a stack of two or more materials, each deposited to thickness less than approximately 3.0 nanometers. For example, the individual layers may be deposited in an alternating configuration. Each individual layer of the multi-layered stack may have a layer thickness of between approximately 0.1 and 3.0 nanometers. In one example, two materials are used for the multi-layered stack, and an alternating configuration defines pairs of layers in the stack. In that case, the number of pairs in the multi-layered stack may be between 5 and 50, although the invention is not necessarily limited in that respect. In other cases, three or more different layers may define a period of the multi-layered stack. A period is analogous to a pair of layers in a stack, but may include three or more different layers each deposited to a thickness less than approximately 3.0 nanometers.

A multi-layered stack provides a magnetic structure for magnetic recording, and provides a useful alternative to cobalt alloys used for that purpose. As described in greater detail below, a seed layer of titanium, followed by a seed layer of platinum can facilitate the realization of perpendicular magnetic media having a multi-layered stack to provide the magnetic structure for magnetic recording. Moreover, seed layers of titanium followed by platinum can facilitate creation of perpendicular media without requiring high temperature thin film deposition needed for some conventional media fabrication.

Figure 1:
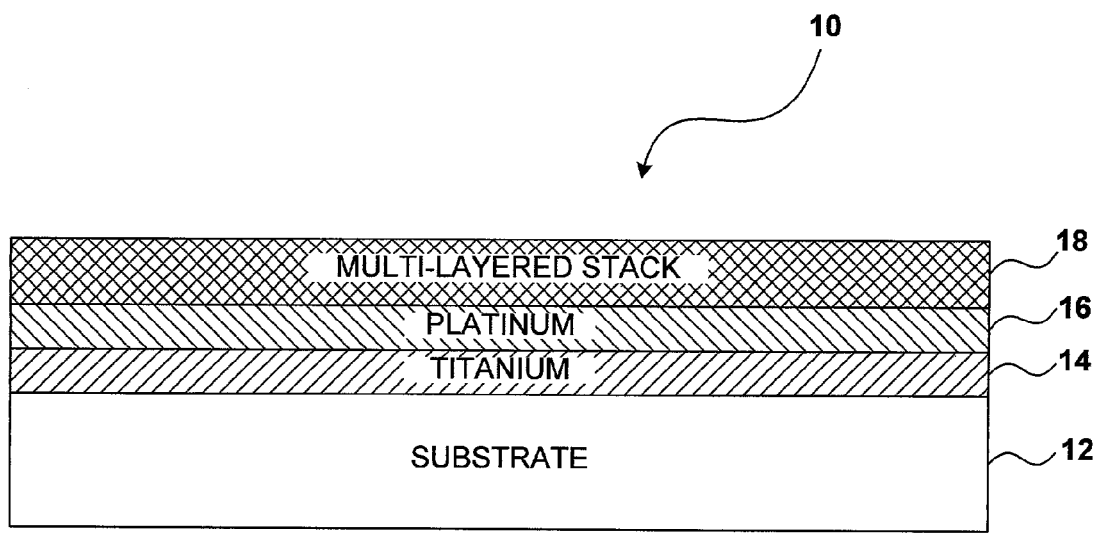
FIG. 1 is an enlarged cross-sectional side view of an exemplary magnetic recording medium according to an embodiment of the invention.

FIG. 1 is an enlarged cross-sectional side view of an exemplary magnetic recording medium 10 according to an embodiment of the invention. By way of example, magnetic recording medium 10 may be a magnetic hard drive, a magnetic diskette, magnetic tape, or the like. In any case, magnetic medium 10 includes a substrate 12, a layer of titanium 14 formed over substrate 10, a layer of platinum 16 formed over the layer of titanium 14, and a multi-layered magnetic stack 18 formed over the layer of platinum 16. The various layers can be deposited upon one another during the media fabrication process using any of a wide variety of conventional deposition techniques. Example deposition techniques include e-beam evaporation, various forms of sputtering such as magnetron sputtering, ion beam sputtering, or the like. Additionally, other layers such as an encapsulating layer between the substrate 12 and the layer of titanium 14 may be included. Also, a soft magnetic underlayer, such as a layer of permalloy, may be provided between the substrate 12 and the layer of titanium 14.

As described in greater detail below, the layer of titanium 14 provides a seed layer to improve the crystal texture of the layer of platinum 16. The layer of platinum 16, in turn, provides a seed layer to improve the crystal texture of the multi-layered magnetic stack 18 so that anisotropy is perpendicular to the surface of the medium. In this manner, high perpendicular magnetic anisotropy can be achieved and storage densities can be increased. If desired, additional layers may be added over the multi-layered stack 18, such as one or more barrier layers to improve rigidity or stability, or to improve head flyability.

Substrate 12 may comprise glass, plastic, organic resin, metal, or any other suitable substrate material. The described structures and compositions may be particularly useful when plastic substrates are used because high temperatures required for creation of some conventional media can be avoided. In other words, the invention may realize perpendicular magnetic anisotropy on a medium that includes a plastic substrate. The use of plastic as a substrate material is advantageous because of it can be injection molded quickly and easily, and can be formed at relatively low cost. In accordance with the invention, perpendicular magnetic media including a multi-layered magnetic stack can be created by deposition processes carried out at temperatures less than 50 degrees Celsius, less than 40 degrees Celsius, or even less than 30 degrees Celsius. In some cases, media can be created by deposition processes performed at room temperature, i.e., at or near approximately 24 degrees Celsius.

The layer of titanium 14 may comprise titanium, or a titanium alloy such as $Ti_{90}Cr_{10}$. The titanium layer 14 may define a thickness between approximately 1 and 100 nanometers, between approximately 2 and 50 nanometers, or between approximately 5 and 40 nanometers. For example, titanium layer 14 may be approximately 10 nanometers thick. The layer of platinum 16 may comprise platinum, or possibly a platinum alloy, such as a platinum-palladium alloy. The layer of platinum 16 may define a thickness between approximately 1 and 20 nanometers, or more specifically between approximately 2 and 10 nanometers.

In one embodiment, the multi-layered magnetic stack 18 comprises pairs of alternating layers of platinum and cobalt. In another embodiment, the multi-layered magnetic stack 18 comprises pairs of alternating layers of palladium and cobalt. In still other embodiments, three or more different layers may be included in the multi-layered stack. By depositing the layer of titanium 14, followed by the layer of platinum 16, high perpendicular magnetic anisotropy in a subsequently deposited multi-layered stack can be achieved. In this manner, improved perpendicular magnetic anisotropy over that of conventional cobalt alloys can be achieved. Also, the deposition processes for creating the described media can be carried out at temperatures less than one or more of those listed above, which can facilitate the use of various plastic materials for substrate 12.

Figure 2:
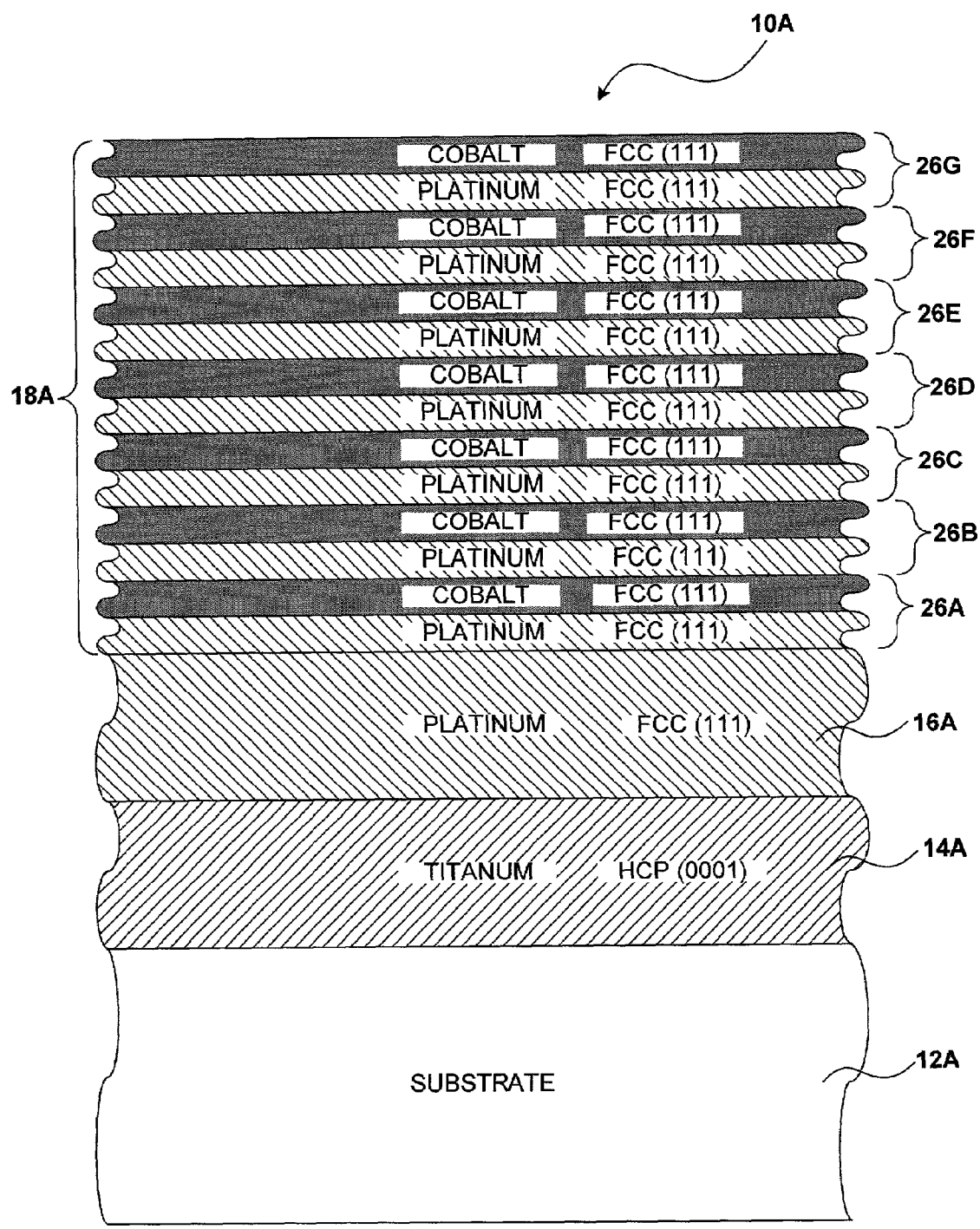
FIGS. 2 and 3 are enlarged cross-sectional side views of a portion of exemplary magnetic recording media according to two embodiments of the invention.

FIG. 2 is an enlarged cross-sectional side view of a portion of an exemplary magnetic recording medium according to an embodiment of the invention. As shown, medium 10A includes a substrate 12A, a layer of titanium 14A formed over the substrate 10A, a layer of platinum 16A formed over the layer of titanium 14A, and a multi-layered magnetic stack 18A formed over the layer of platinum 16A. Again, in some embodiments, additional layers may also be included such as an encapsulating layer to encapsulate the substrate or a magnetic underlayer to further enhance record densities.

The various layers illustrated in FIG. 2 are labeled to describe the crystal texture of the different layers. The term "crystal texture" refers collectively to the crystal phase and the crystalline orientation of a layer. As shown, the layer of titanium 14A may include hexagonal close pack (HCP) crystallites in a (b 0001) orientation. In other words, the crystal phase of titanium layer 14A is HCP and the crystalline orientation is (0001). The notation "(0001)" refers to an orientation in which the C-axis of the crystallites is substantially perpendicular to the film plane. In some cases, the layer of titanium 14A may consist essentially of hexagonal close pack (HCP) crystallites in a (0001) orientation. The layer of platinum 16A may include face centered cubic (FCC) crystallites in a (111) orientation. In other words, the crystal phase of the platinum layer 16A is FCC and the crystalline orientation is (111). In some cases, the layer of platinum 16A may consist essentially of face centered cubic (FCC) crystallites in a (111) orientation. The multi-layered magnetic stack 18A may comprise pairs 26A–26G (sometimes referred to as periods) of alternating layers of platinum and cobalt including face centered cubic (FCC) crystallites in a (111) orientation. In some cases, the pairs 26A–26G of alternating layers of platinum and cobalt consist essentially of face centered cubic (FCC) crystallites in a (111) orientation.

The layers of platinum in the multi-layered stack may define a thickness between approximately 0.5 and 2.5 nanometers, such as a thickness of approximately 1.0 nanometers, and the layers of cobalt in the multi-layered stack may define a thickness between approximately 0.15 and 1.0 nanometers, such as a thickness of approximately 0.35 nanometers. The number of pairs 26 of alternating layers of platinum and cobalt may be between 5 and 50 inclusive, or more specifically between 9 and 20 inclusive. For example, 18 pairs of alternating layers of platinum and cobalt may be used. The overall thickness of multi-layered stack 18A may be in the range of approximately 5 to 50 nanometers. For simplicity in the illustrated example, however, seven pairs 26A–26G of alternating layers of platinum and cobalt are shown. Medium 10A may exhibit a magnetic anisotropy greater than $4.0*10^6$ ergs/cm$^3$.

Figure 3:
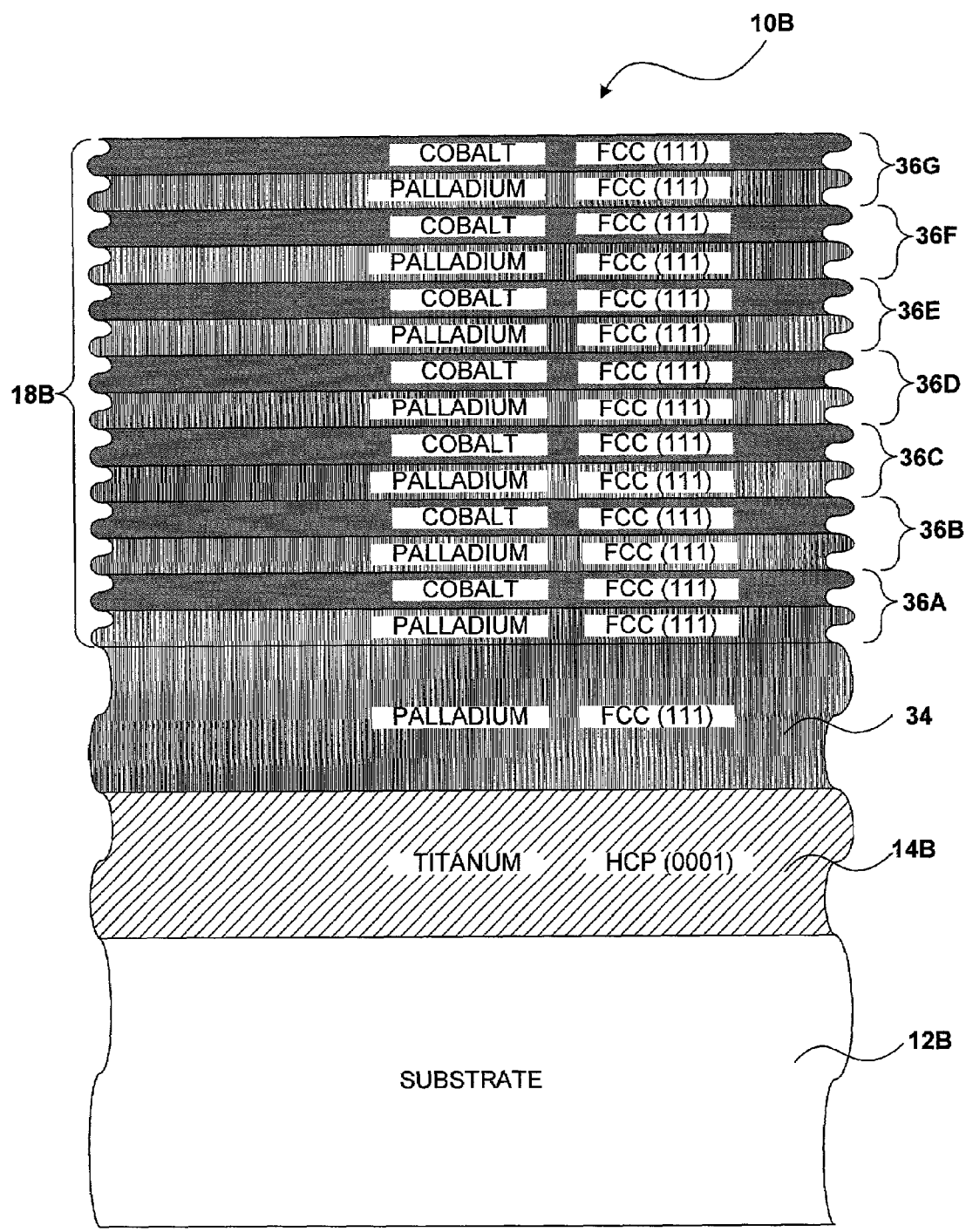

FIG. 3 is another enlarged cross-sectional side view of a portion of an exemplary magnetic recording medium according to an embodiment of the invention. As shown, medium 10B includes a substrate 12B, a layer of titanium 14B formed over substrate 12B, a layer of palladium 34 formed over the layer of titanium 14B, and a multi-layered magnetic stack 18B formed over the layer of palladium 34. In some embodiments, additional layers may also be included.

In the example of FIG. 3, the multi-layered magnetic stack includes pairs 36A–36G of alternating layers of palladium and cobalt. In that case, the layers of palladium in multi-layered stack 18B may define a thickness between approximately 0.3 and 1.8 nanometers, and the layers of cobalt in multi-layered stack 18B may define a thickness between approximately 0.15 and 1.0 nanometers. The number of pairs 36 of alternating layers of palladium and cobalt may be between 5 and 50 inclusive. The overall thickness of multi-layered stack 18B may be in the range of approximately 5 to 50 nanometers. For simplicity, however, seven pairs 36A–36G of alternating layers of palladium and cobalt are illustrated.

As labeled in FIG. 3, the layer of titanium 14B may include hexagonal close pack (HCP) crystallites in a (0001) orientation, and the layer of palladium 34 may include face centered cubic (FCC) crystallites in a (111) orientation. In some cases, the layer of titanium 14B may consist essentially of hexagonal close pack (HCP) crystallites in a (0001) orientation, and the layer of palladium 34 may consist essentially of face centered cubic (FCC) crystallites in a (111) orientation. The multi-layered magnetic stack 18B may comprise pairs 36A–36G of alternating layers of palladium and cobalt including face centered cubic (FCC) crystallites in a (111) orientation. In some cases, the pairs 36A–36G of alternating layers of palladium and cobalt consist essentially of face centered cubic (FCC) crystallites in a (111) orientation.

In still other embodiments, a medium may include seed layers of titanium followed by platinum, followed by a multi-layered stack that includes alternating layers of palladium and cobalt. Also, a medium may include seed layers of titanium followed by palladium, followed by a multi-layered stack that includes alternating layers of platinum and cobalt. In other words, palladium and platinum may be substituted for one another in various different embodiments. In some cases, a palladium-platinum alloy may be used. During deposition of the multi-layered stack the cobalt may be deposited first, or alternatively the palladium or platinum may be deposited first as shown in FIGS. 2 and 3. These and other modifications will become apparent in light of this disclosure.

Figure 4:
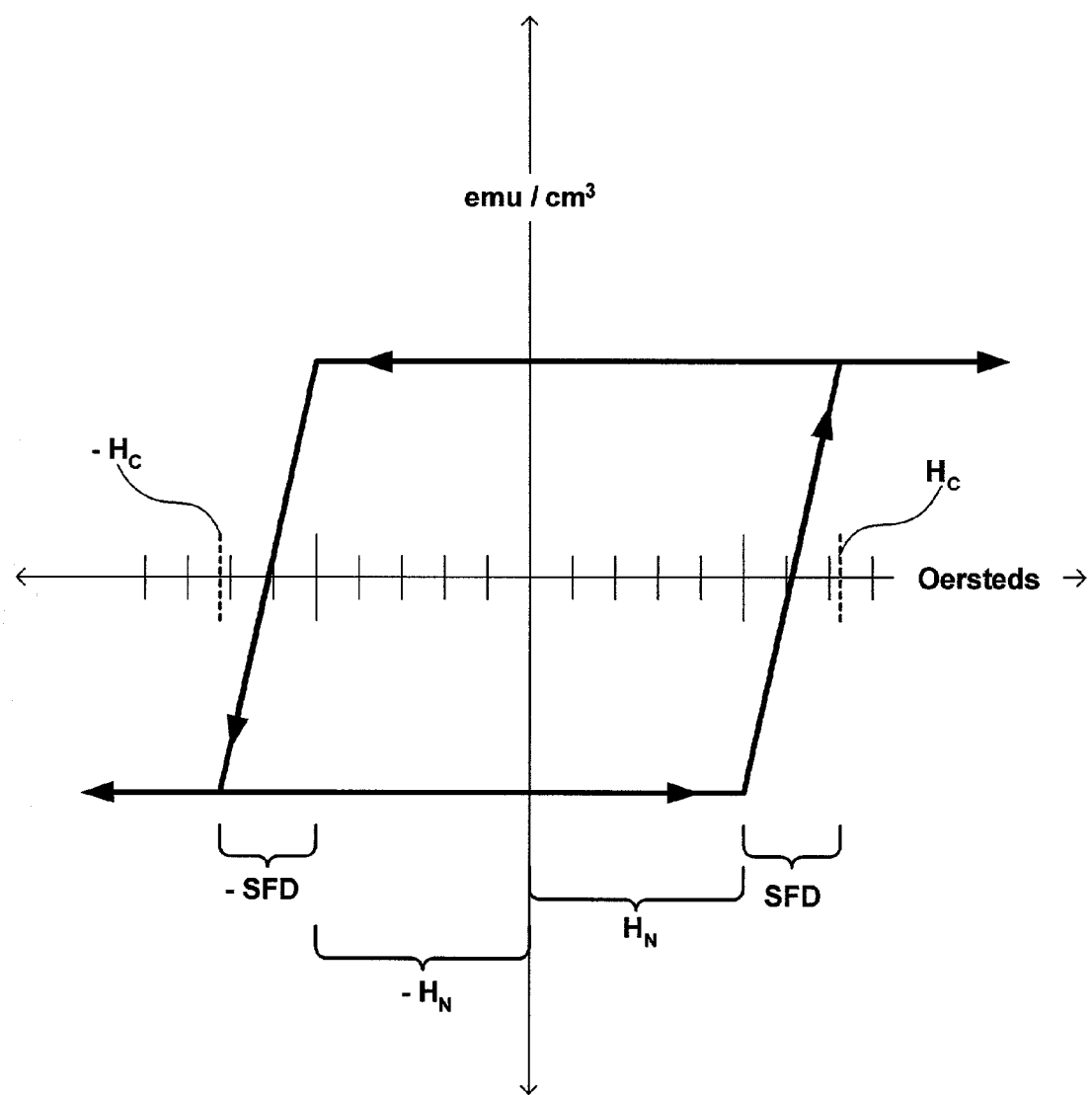
FIG. 4 is a graph of a hysteresis curve used to explain various qualities of media conforming to one or more embodiments described herein.

FIG. 4 is a graph of a hysteresis curve illustrating various qualities of media conforming to one or more embodiments described herein. In particular, medium 10 may exhibit a coercivity ($H_C$) between approximately 2000 and 10,000 Oersteds. Coercivity refers to the magnetic field strength needed to reverse a given magnetization. For example, magnetic recording medium 10 may exhibit a coercivity greater than approximately 2000 Oersteds, greater than approximately 5000 Oersteds, or greater than approximately 7000 Oersteds. High coercivity may improve magnetic stability and reliability of medium 10.

Additionally, medium 10 may exhibit a hysteresis curve having a switching field distribution (SFD) less than 30 percent of its coercivity ($H_C$), and a nucleation field ($H_N$) greater than 80 percent of its coercivity ($H_C$). The switching field distribution refers to the interval of magnetic field strength over which a given magnetization can be completely reversed. Small switching field distributions relative to the coercivity may further improve record performance of medium 10 by improving the signal to noise (S/N) ratio. M(H) in the switching field, i.e., the slope of the hysteresis curve in the SFD, may change linearly as illustrated in FIG. 4, or non-linearly. The nucleation field refers to the point of magnetic field strength when the magnetization begins to switch. Large nucleation fields relative to the coercivity may improve magnetic stability and reliability of medium 10.

Figure 5:
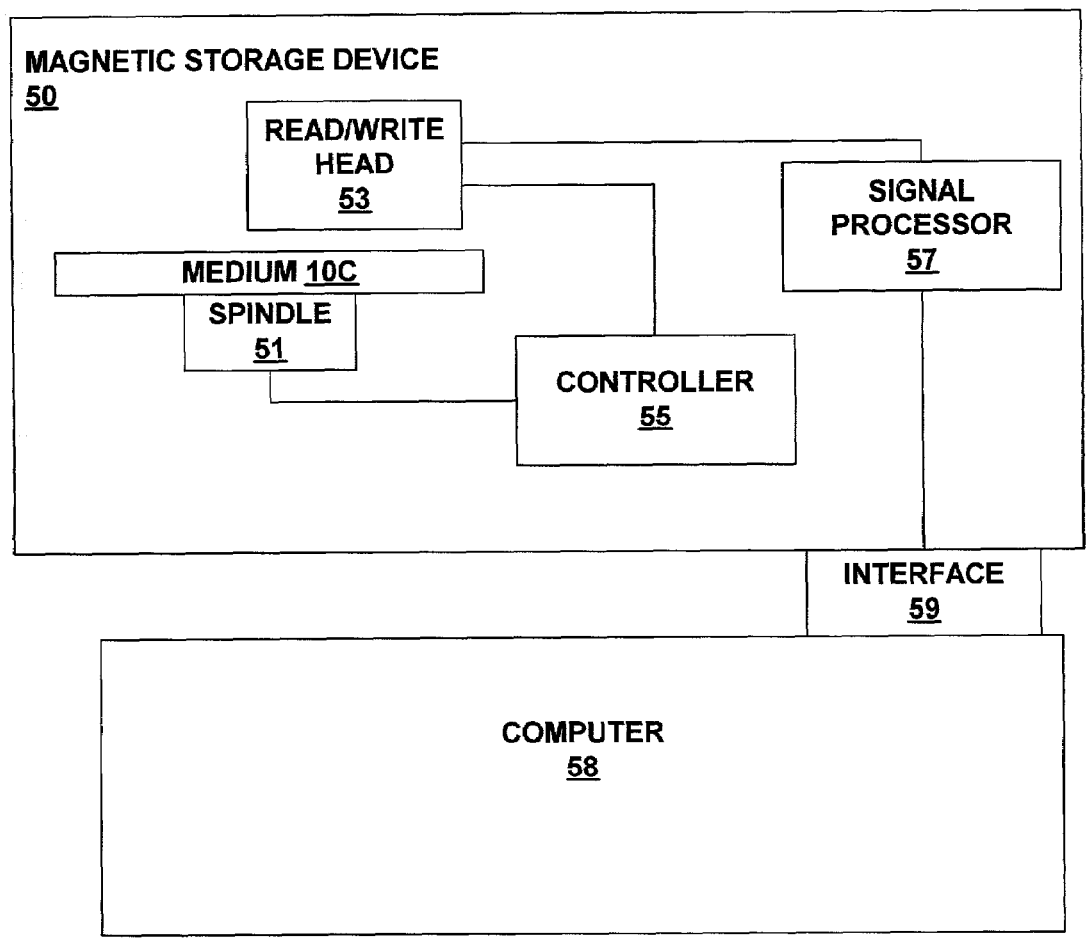
FIGS. 5 and 6 are exemplary block diagrams of magnetic storage devices that may be used to read or write data to media in accordance with embodiments of the invention.
Figure 6:
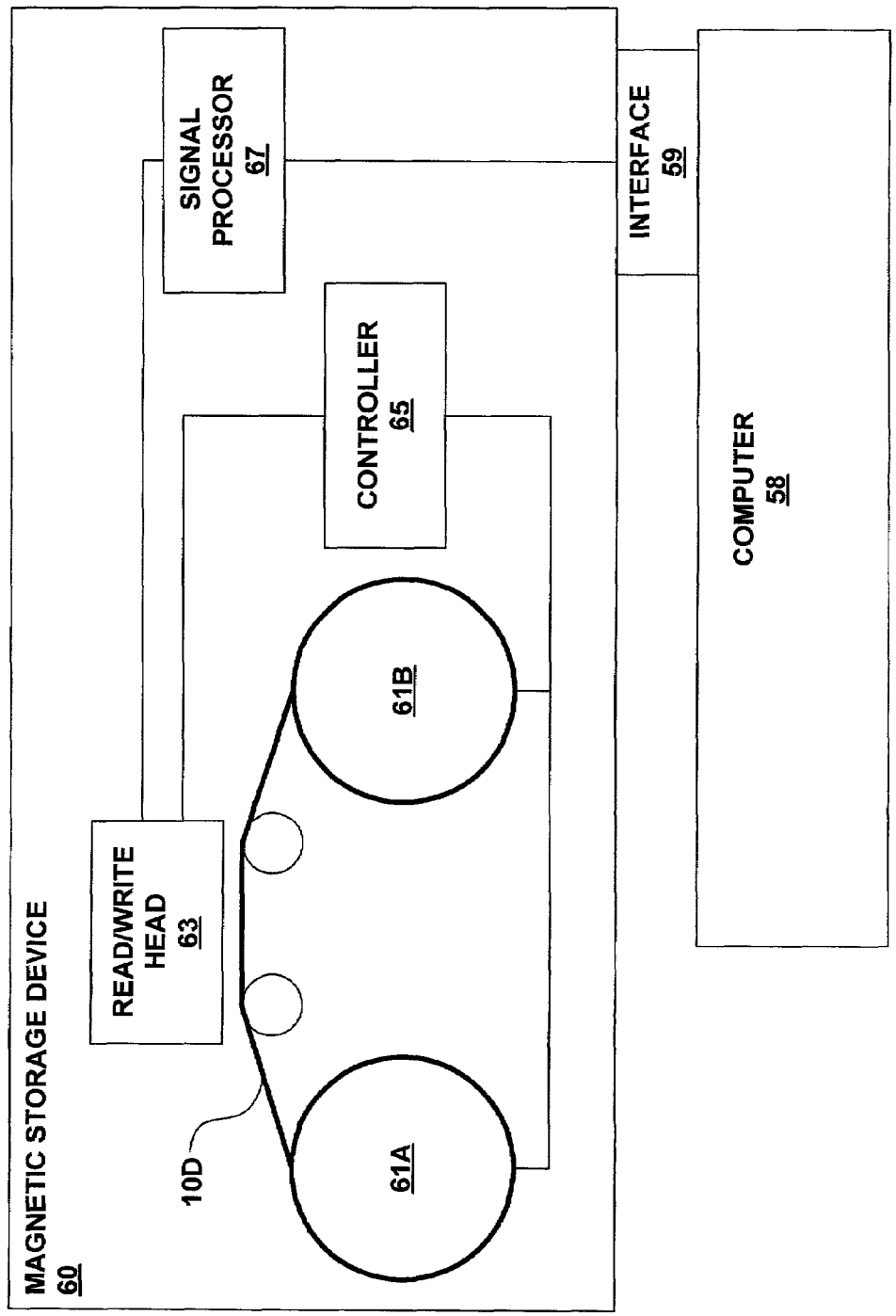

FIGS. 5 and 6 are block diagrams of exemplary magnetic storage devices that may be used to read or record data on media described herein. As shown in FIG. 5, magnetic storage device 50 may be used with a disk shaped medium 10C. In that case, magnetic storage device 50 may comprise a magnetic disk drive, a hard disk drive, a floppy disk drive, or the like. The magnetic storage medium 10C may include a substrate, a layer of titanium formed over the substrate, a layer of platinum formed over the layer of titanium, and a multi-layered magnetic stack formed over the layer of platinum. Spindle 51 may be used to spin medium 10C and read/write head 53 may be positioned to detect magnetic domains on medium 10C. A controller 55 controls spindle 51 and read/write head 53 to precisely position read write head 53 relative to medium 10C. A signal processor 57 interprets detected magnetic domains.

As illustrated, magnetic storage device 50 may be coupled to a computer 58 via an interface 59. For example, computer 58 may comprise a central processing unit for any of a variety of computer devices, including, for example, a PC, a Macintosh, a computer workstation, a hand-held data terminal, a palm computer, a cell phone, digital paper, a digital television, a wireless device (in which case interface 59 may be wireless), a personal digital assistant, a laptop computer, a desktop computer, a digital camera, a digital recording device, or the like.

As shown in FIG. 6, magnetic storage device 60 may be used with a medium 10D that includes magnetic tape. In that case, magnetic storage device 60 may comprise a magnetic tape drive, a magnetic tape cartridge drive, or the like. Medium 10D may include magnetic tape spooled onto one or more spools 61A and 61B. Spools 61 may be housed in a cartridge, although the invention is not limited in that respect. The magnetic storage medium 10D in the form of magnetic tape may include a substrate, a seed layer of titanium formed over the substrate, a seed layer of platinum formed over the layer of titanium, and a multi-layered magnetic stack formed over the layer of platinum. Read/write head 63 may be positioned to detect magnetic domains on medium 10D. A controller 65 controls the positioning of read/write head 63 as well as the movement of medium 10D such as by turning spools 61A and/or 61B to precisely position read write head 63 relative to medium 10D. A signal processor 67 interprets detected magnetic domains.

Like in FIG. 5, magnetic storage device 60 of FIG. 6 may be coupled to a computer 58 via an interface 59. Again, computer 58 may comprise a central processing unit for any of a variety of computer devices, including, for example, a PC, a Macintosh, a computer workstation, a hand-held data terminal, a palm computer, a cell phone, digital paper, a digital television, a wireless device, a personal digital assistant, a laptop computer, a desktop computer, a digital camera, a digital recording device, or the like.

The invention may be capable of providing a number of advantages. In particular, perpendicular magnetic media according to the principles of the invention may achieve higher storage densities than conventional longitudinal media. Also, the structures and compositions described below may provide improved stability against thermal decay relative to some conventional media. In addition, the invention may provide compatibility with low temperature thin film deposition processes. Lower temperature thin film deposition processes, in turn, may allow plastic substrates to be used, which can reduce the cost of media. The invention can be used to improve crystal texture of media as shown and described with reference to FIGS. 2 and 3, such as by improving the crystal phase and the crystalline orientation of various layers.

The invention may also be used to improve the coercivity, the switching field distribution, and/or the nucleation field of media as shown and described with reference to the graph of FIG. 4. The magnetic anisotropy can also be improved. In short, in accordance with the principles described herein, improved perpendicular media can be realized. The following examples may provide additional details of media in accordance with the invention.

EXAMPLES

Figure 7:
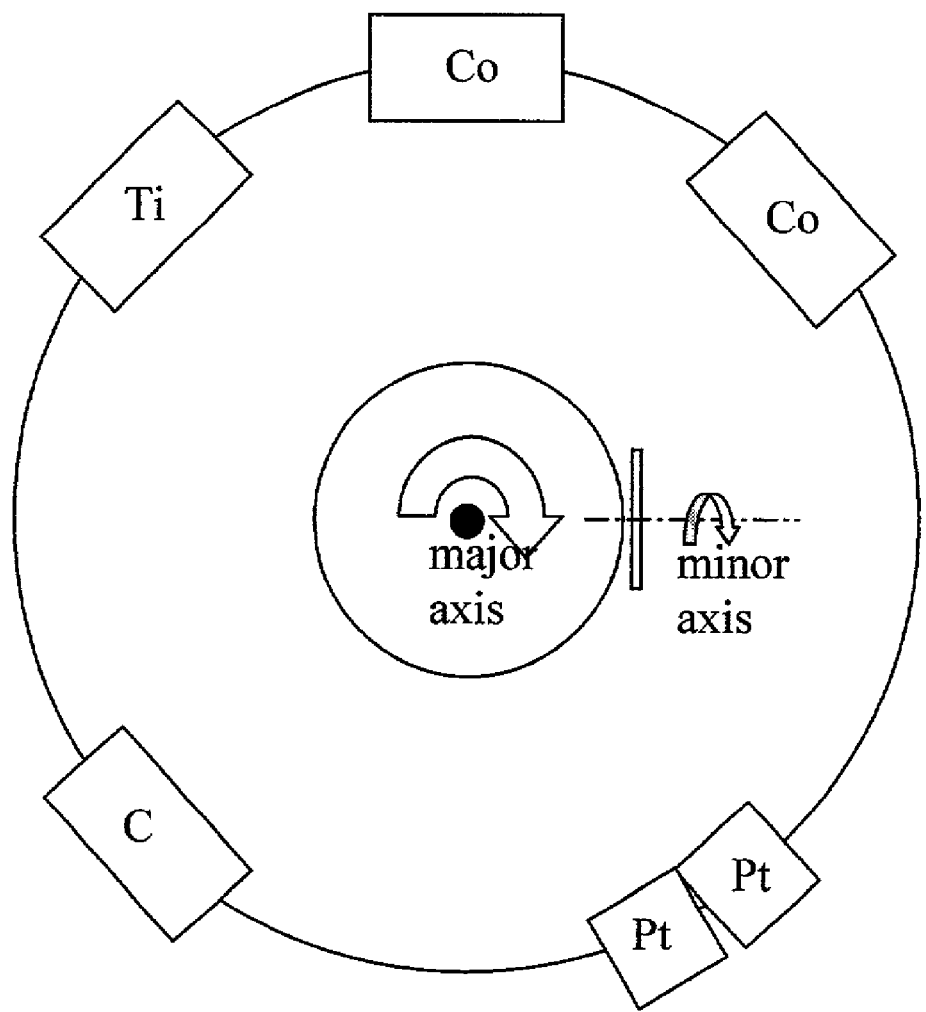
FIG. 7 is a conceptual diagram illustrating deposition techniques used in the examples described herein.

The thin films of the following seven examples were coated in a high vacuum sputtering system equipped with a planetary. The planetary was made to revolve about its major axis, passing the substrate opposite the sputter sources in the system in a repetitive fashion, or the planetary was made to fix the substrate at a position directly opposite a specified sputter source for a designated time interval. In both modes of operation, the substrate was always made to spin around its own minor axis as illustrated in FIG. 7. In all of the examples, the substrates were near room temperature, i.e., at approximately 24 degrees Celsius. The substrates were not actively heated during the depositions.

The sputter sources used in all of the examples were DC magnetrons. The sources in the system included a Ti source, a C source, two Co sources, and two Pt sources. The Ti, C, and Co sputter sources were all 6" in diameter. The Pt sources were 3"in diameter and were located side by side with the cathode ground shields less than 5 mm apart from one another. Ar was used as the sputtering gas in all of the examples. The distance from the front of a sputter source cathode to a substrate directly opposite the source was approximately 10 cm. M(H) measurement results, i.e., hysteresis curves shown in each example, were obtained using an ADE Technologies DMS Model 880 VSM (vibrating sample magnetometer.) X ray diffraction results were obtained using a Siemens D5005 X-ray diffractometer.

Example 1

In this example, a substrate of soda lime glass was mounted onto the planetary sample platten. The system was pumped to a base pressure of 1.2 E-9 Torr. Using a major axis speed of 0.4 rev/sec and a minor axis speed of 3.2 rev/sec, 25 Å of Ti was deposited at a source power of 1 kW and an Ar pressure of 2 mT. Then, with the substrate directly opposite and symmetrically disposed between the two Pt sources, and at a major axis speed of 0 rev/sec and a minor axis speed of 2.5 rev/sec, 20 Å of Pt was deposited with each Pt source operated at 75 W at an Ar pressure of 2 mT. Alternating layers of 3.5 Å of Co and 10 Å of Pt were then deposited with the planetary major axis speed of 0.12 rev/sec and a minor axis speed of 2.88 rev/sec. Each of the two Co sources was operated at 109 W and each of the two Pt sources were operated at 83 W. Nine periods of Co/Pt were coated for a total thickness of 122 Å. Co was the first layer to be coated. The Ar pressure during the Co/Pt multi-layered deposition was 40 mT. Finally 60 Å of C was deposited at a major axis speed of 0.4 rev/sec and a minor axis speed of 3.2 rev/sec, with the C source operated at 500 W at an Ar pressure of 2 mT.

Figure 8:
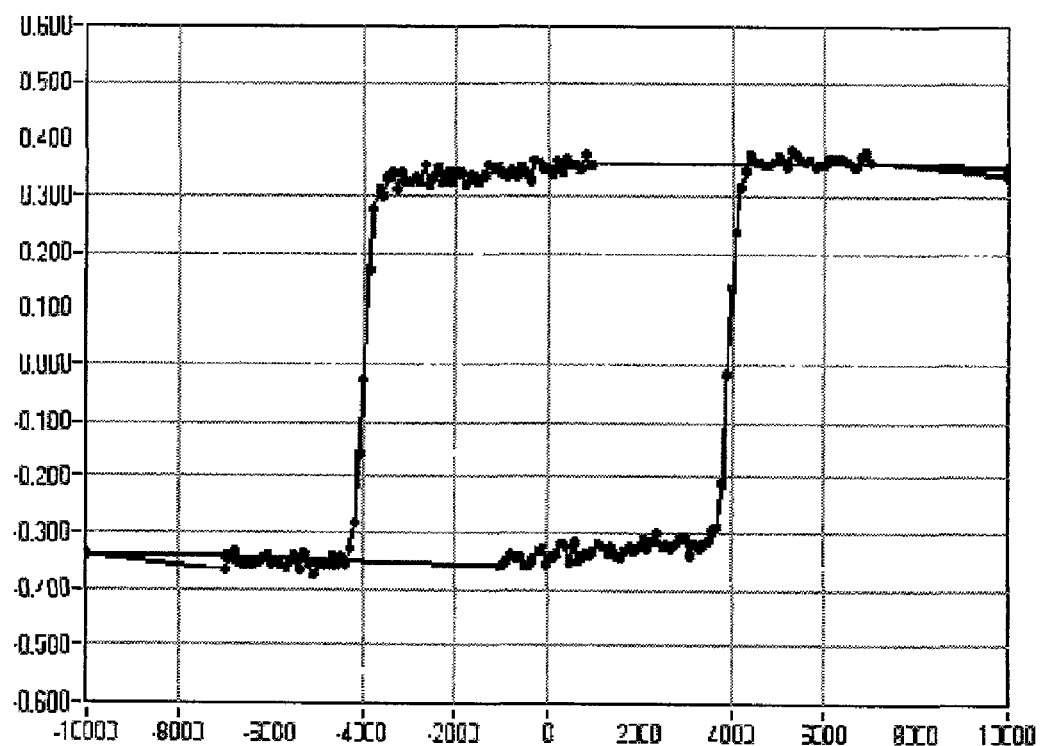
FIGS. 8–14 are graphs illustrating qualities of media created according to various examples.

The measured M(H) loop, i.e., the hysteresis curve, for the sample created according to Example 1 is shown in FIG. 8. $H_C$=3948 Oe. $H_N$=3500 Oe. The total range of the SFD is less than 1000 Oe.

Example 2

In this example, a substrate of soda lime glass was mounted onto the planetary sample platten. The system was pumped to a base pressure of 3.5 E-9 Torr. With a major axis speed of 0.4 rev/sec and a minor axis speed of 3.2 rev/sec, 400 Å of Ti was deposited at a source power of 1 kW and an Ar pressure of 2 mT. Then, with the substrate directly opposite and symmetrically disposed between the two Pt sources, at a major axis speed of 0 rev/sec and a minor axis speed of 1.5 rev/sec, 100 Å of Pt was deposited with each Pt source operated at 150 W at an Ar pressure of 40 mT. Alternating layers of 3.5 Å of Co and 10 Å of Pt were then deposited with the planetary major axis speed of 0.25 rev/sec and a minor axis speed of 4.02 rev/sec. Each of the two Co sources was operated at 219 W and each of the two Pt sources were operated at 167 W. Nine periods of Co/Pt were coated for a total thickness of 122 Å. Co was the first layer to be coated. The Ar pressure during the Co/Pt multi-layered deposition was 40 mT. Finally 120Å of C was deposited at a major axis speed of 0.4 rev/sec and a minor axis speed of 3.2 rev/sec, with the C source operated at 500 W at an Ar pressure of 2 mT.

Figure 9:
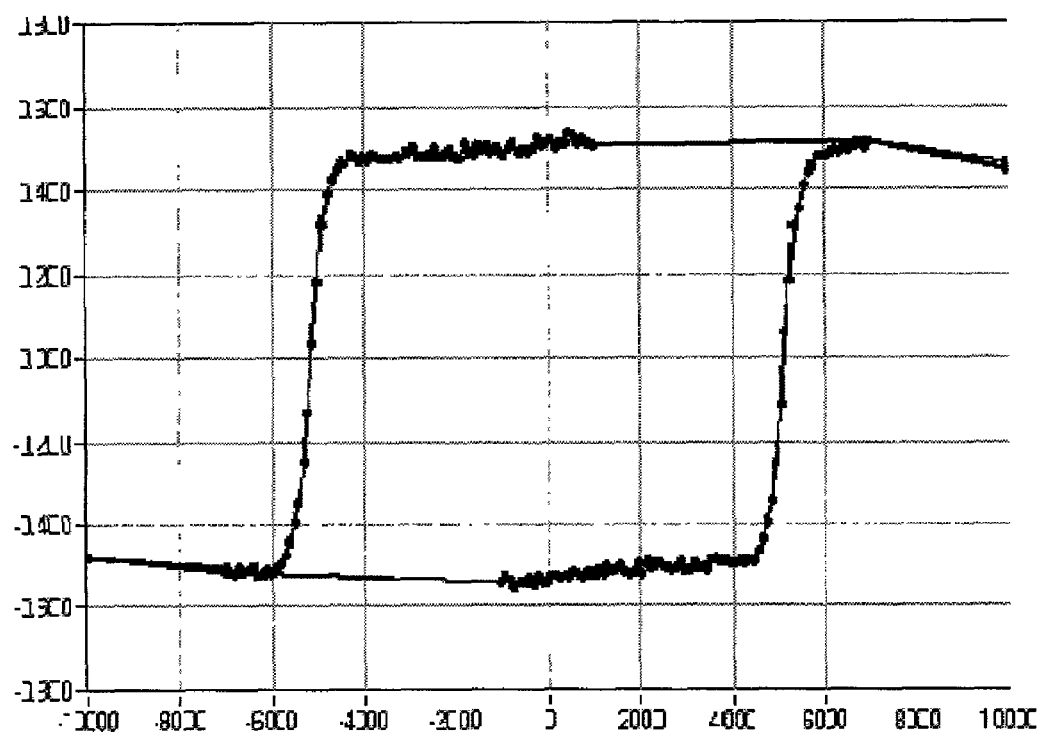

The measured M(H) loop, i.e., the hysteresis curve, for the sample created according to Example 2 is shown in FIG. 9. $H_C$=5136 Oe. $H_N$=4500 Oe. The total range of the SFD is approximately 1400 Oe.

Example 3

The thin film samples for this example were fabricated with the same procedure as in Example 2, except that 18 periods of Co/Pt were coated for a total thickness of 244 Å. The starting base pressure of the system was 1.2 E-9 Torr.

Figure 10:
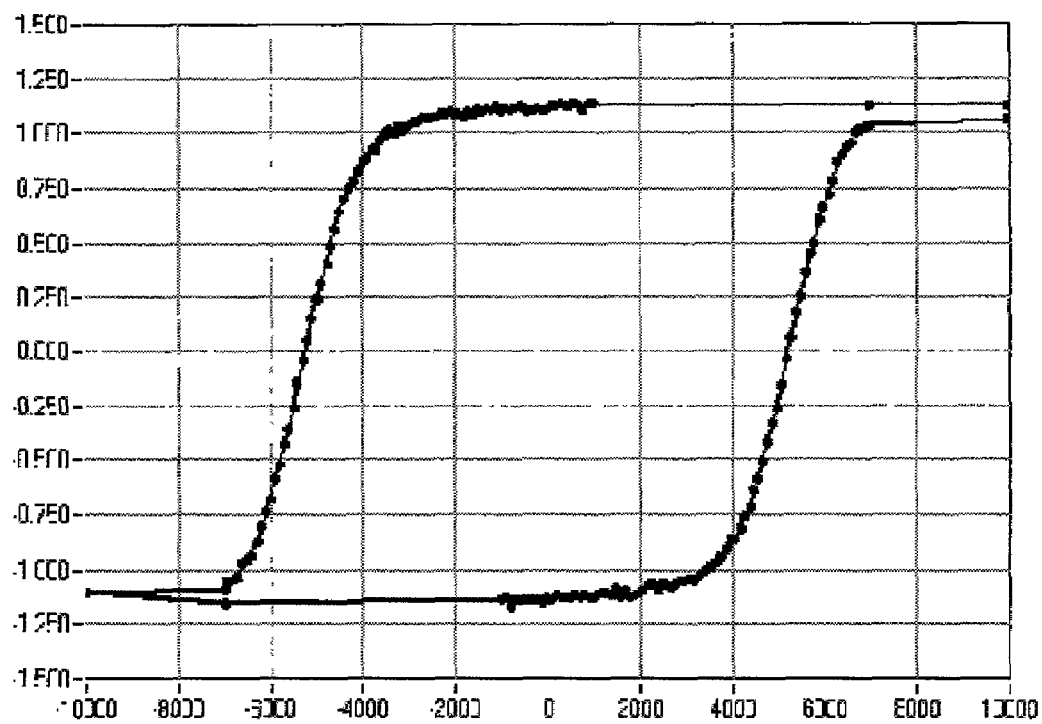

The measured M(H) loop, i.e., the hysteresis curve, of a sample created according to Example 3 is shown in FIG. 10. $H_C$=5239 Oe. $H_N$~2900 Oe. The total range of the SFD is approximately 4000 Oe.

Example 4

In this example, a polycarbonate disk substrate was mounted onto the planetary sample platten. The system was pumped to a base pressure of 1.4 E-8 Torr. First, 120 Å of C was deposited at a major axis speed of 0.4 rev/sec and a minor axis speed of 3.2 rev/sec, with the C source operated at 500 W at an Ar pressure of 2 mT. With a major axis speed of 0.4 rev/sec and a minor axis speed of 3.2 rev/sec, 400 Å of Ti was then deposited at a source power of 1 kW and an Ar pressure of 2 mT. Then, with the substrate directly opposite and symmetrically disposed between the two Pt sources, at a major axis speed of 0 rev/sec and a minor axis speed of 2.5 rev/sec, 100 Å of Pt was deposited with each Pt source operated at 75 W at an Ar pressure of 30 mT. Alternating layers of 3.5 Å of Co and 10 Å of Pt were then deposited with the planetary major axis speed of 0.25 rev/sec and a minor axis speed of 4.02 rev/sec. Each of the two Co sources was operated at 172 W and each of the two Pt sources were operated at 175 W. 18 periods of Co/Pt were coated for a total thickness of 244 Å. Co was the first layer to be coated. The Ar pressure during the Co/Pt multi-layered deposition was 30 mT. Finally 120 Å of C was deposited at a major axis speed of 0.4 rev/sec and a minor axis speed of 3.2 rev/sec, with the C source operated at 500 W at an Ar pressure of 2 mT.

Figure 11:
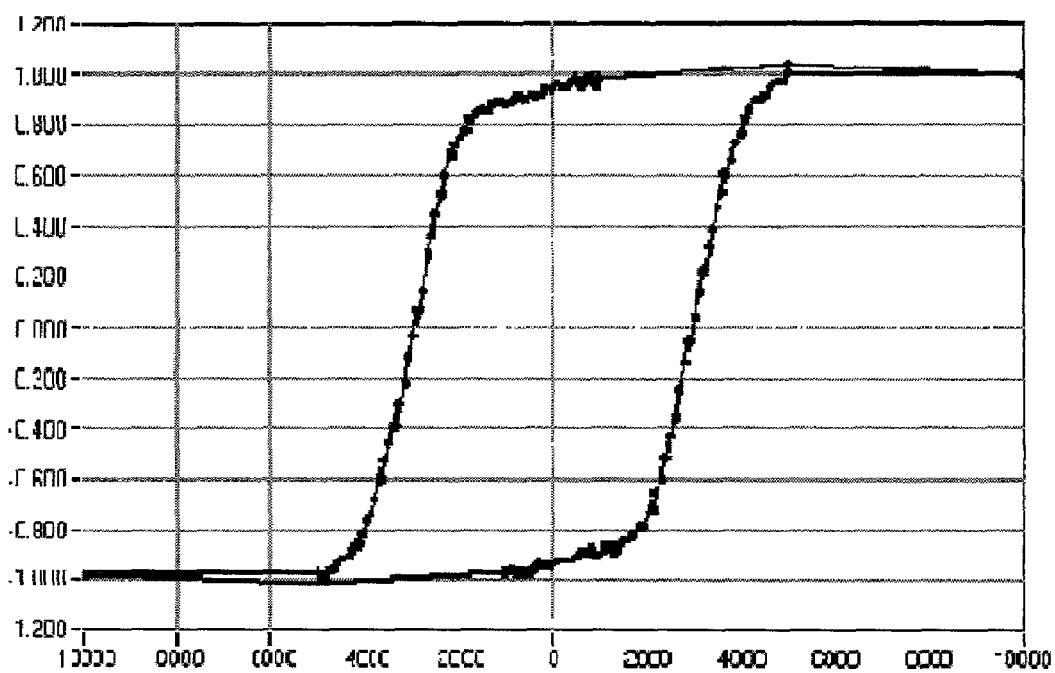

The measured M(H) loop, i.e., the hysteresis curve, for a sample created according to Example 4 is shown in FIG. 11. Hc=2962 Oe. Hn~1800 Oe. The total range of the SFD is approximately 3000 Oe.

Example 5

Thin film samples for this example were fabricated with the same procedure as in Example 1, except that no Ti seed layer was coated. The starting base pressure of the system was 1.3 E-9 Torr.

Figure 12:
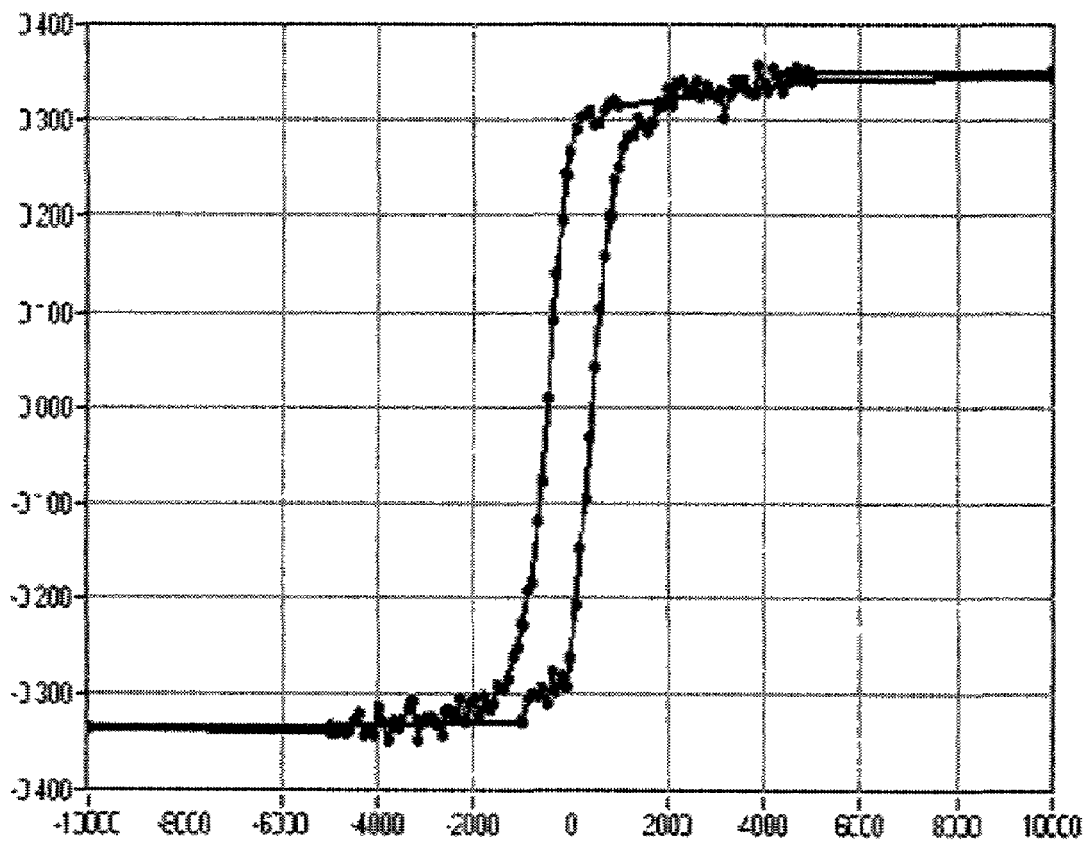

The measured M(H) loop, i.e., the hysteresis curve, for a sample created according to Example is shown in FIG. 12. Hc=474 Oe. Comparison of the results of Example 5 with the results of Example 1 clearly indicate the superior results obtained with the Ti seed layer.

Example 6

In this example, sample 1 was prepared using a soda lime glass substrate which was mounted onto the planetary sample platten. The system was pumped to a base pressure of 6.7 E-9 Torr. With a major axis speed of 0.4 rev/sec and a minor axis speed of 3.2 rev/sec, 200 Å of Ti was deposited at a source power of 1 kW and an Ar pressure of 2 mT. Then, with the substrate directly opposite and symmetrically disposed between the two Pt sources, at a major axis speed of 0 rev/sec and a minor axis speed of 1.5 rev/sec, 400 Å of Pt was deposited with each Pt source operated at 150 W at an Ar pressure of 40 mT. Finally 50 Å of C was deposited at a major axis speed of 0.4 rev/sec and a minor axis speed of 3.2 rev/sec, with the C source operated at 500 W at an Ar pressure of 2 mT.

Sample 2 was prepared using a soda lime glass substrate which was mounted onto the planetary sample platten. The system was pumped to a base pressure of 6.2 E-9 Torr. The substrate was positioned directly opposite and symmetrically disposed between the two Pt sources, at a major axis speed of 0 rev/sec and a minor axis speed of 1.5 rev/ sec. 400 Å of Pt was deposited with each Pt source operated at 150 W at an Ar pressure of 40 mT. Finally 50 Å of C was deposited at a major axis speed of 0.4 rev/sec and a minor axis speed of 3.2 rev/sec, with the C source operated at 500 W at an Ar pressure of 2 mT.

Figure 13:
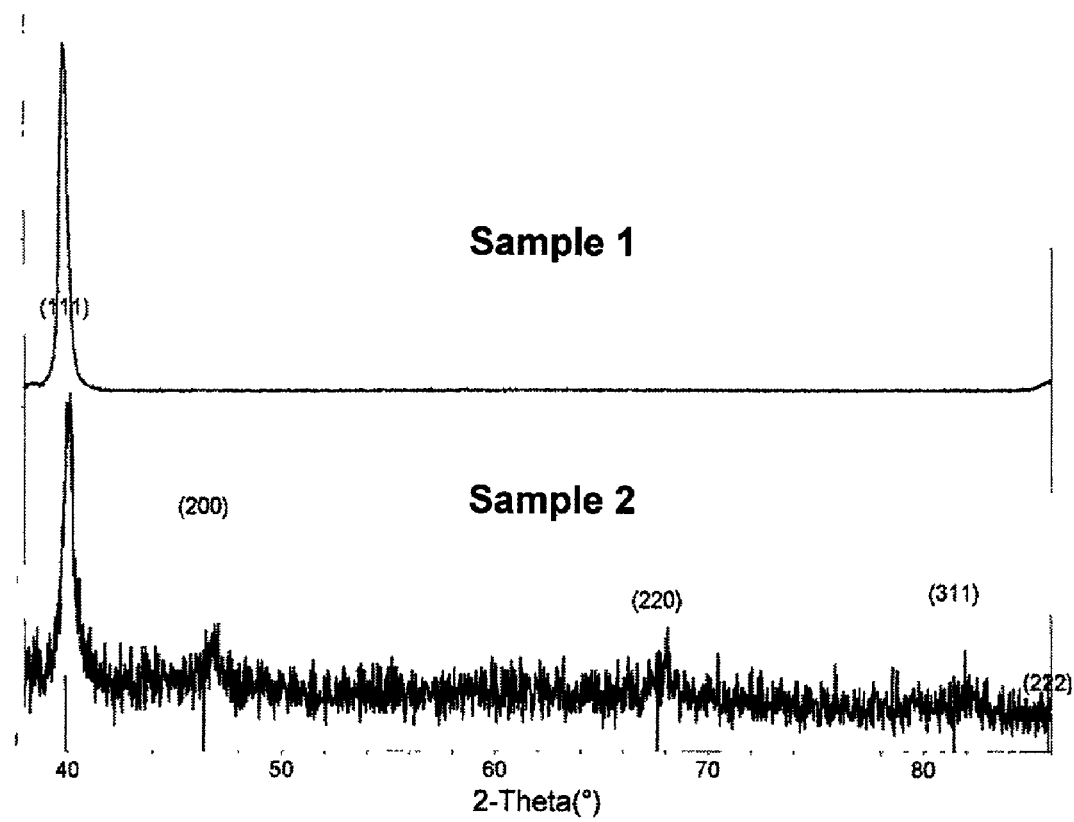

X-ray diffraction was carried out on these two sample with substantially identical measurement conditions. Results are shown in FIG. 13. Both scans were normalized to give approximately equal magnitude of the FCC (111) peak. As can be seen in FIG. 13, sample 1 with the Ti seed layer, is much more strongly oriented than sample 2, and the ratio of the intensity of the (111) peak to the noise level is much greater for sample 1 than for sample 2.

Example 7

In this example, four samples were prepared using a soda lime glass substrates mounted onto the planetary sample platten. The system was pumped to a base pressure of 1.3 E-9 Torr.

Sample 1 was prepared by first placing the sample 1 substrate directly opposite and symmetrically disposed between the two Pt sources, at a major axis speed of 0 rev/sec and a minor axis speed of 1.5 rev/sec. Under these conditions, 200 Å of Pt was deposited with each Pt source operated at 75 W at an Ar pressure of 40 mT. 60 Å of C was then coated using a major axis speed of 0.4 rev/sec and a minor axis speed of 3.2 rev/sec, at a cathode power of 500 W and an Ar pressure of 2 mT.

Sample 2 was prepared by first placing the sample 2 substrate directly opposite the Ti source, at a major axis speed of 0 rev/sec and a minor axis speed of 1.5 rev/ sec, and depositing 25 Å of Ti at a source power of 600 W at an Ar pressure of 2 mT. Then, with the substrate directly opposite and symmetrically disposed between the two Pt sources, and at a major axis speed of 0 rev/sec and a minor axis speed of 1.5 rev/sec, 200 Å of Pt was deposited with each Pt source operated at 75 W at an Ar pressure of 40 mT. 60 Å of C was then coated using a major axis speed of 0.4 rev/sec and a minor axis speed of 3.2 rev/sec, at a cathode power of 500 W and an Ar pressure of 2 mT.

Samples 3 and 4 were prepared by the same procedure as used with sample 2, except that the Ti layer thicknesses were 50 and 400 Å respectively.

Figure 14:
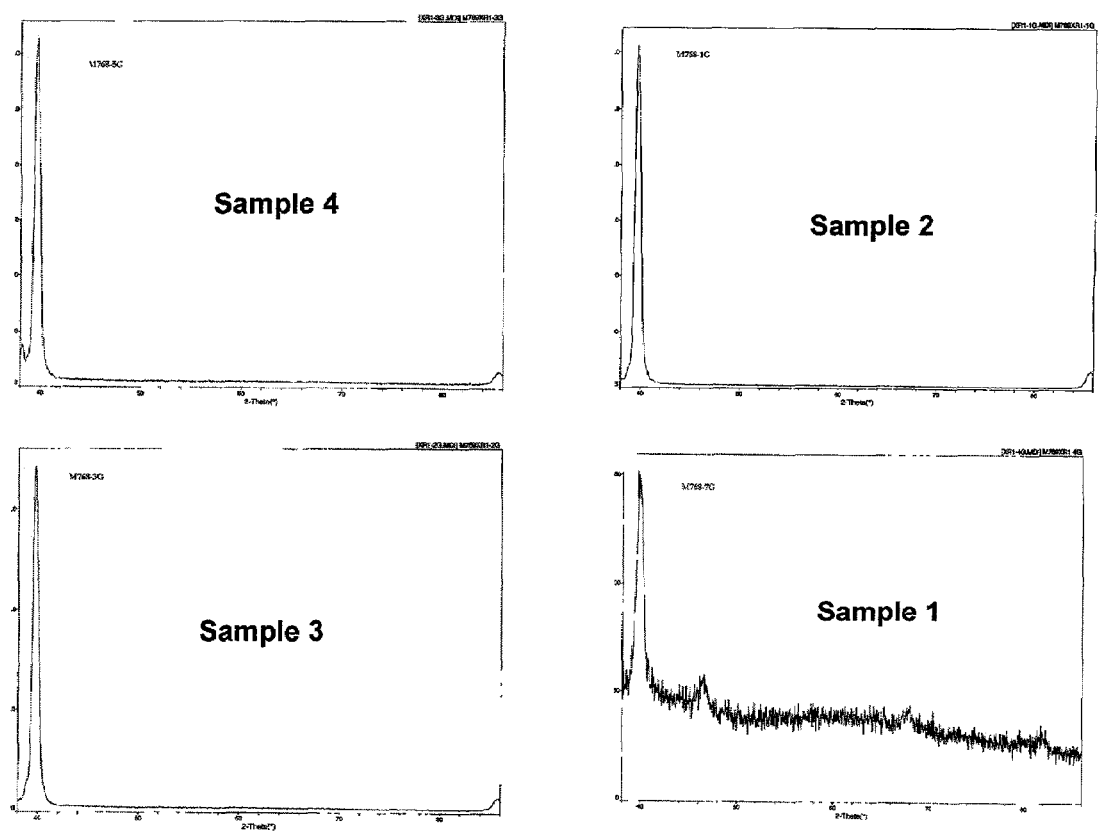

All four samples were submitted to X-ray diffraction measurement using substantially identical spectrometer operating conditions. Results are shown in FIG. 14. Each of the scans has been normalized to give approximately equal heights of their FCC (111) peaks. The effectiveness of only 25 Å of Ti seed material for orienting a 200 Å Pt film appears to be as effective as a much thicker Ti seed layer, and, at the same time is far superior to the relatively un-oriented results obtained with no Ti seed layer.

Various embodiments of the invention have been described. For instance, a number of different embodiments of perpendicular magnetic media have been described. Nevertheless, modifications may be made without departing from the scope of the invention. Accordingly, other embodiments are within the scope of the following claims.

What is claimed is:

1. A magnetic recording medium comprising:
   a substrate;
   a seed layer of titanium formed over the substrate, the seed layer of titanium including hexagonal close pack (HCP) crystallites in a (0001) orientation;
   a seed layer of platinum formed over the layer of titanium, the seed layer of platinum including face centered cubic (FCC) crystallites in a (111) orientation; and
   a multi-layered magnetic stack formed over the layer of platinum, wherein the multi-layered magnetic stack includes a plurality of layers each having a thickness of less than or equal to approximately 3 nanometers, and wherein the multi-layered magnetic stack comprises pairs of alternating layers including face centered cubic (FCC) crystallites in a (111) orientation, wherein each of the pairs defines a period of the multi-layered magnetic stack, and wherein the medium exhibits a coercivity greater than or equal to approximately 3948 Oersteds and a hysteresis curve having a nucleation field greater then 80 percent of its coercivity.

2. The magnetic medium of claim 1, wherein the seed layer of titanium comprises a titanium alloy.

3. The magnetic medium of claim 1, wherein the seed layer of titanium defines a thickness between approximately 1 and 100 nanometers.

4. The magnetic medium of claim 1, wherein the seed layer of platinum defines a thickness between approximately 1 and 20 nanometers.

5. The magnetic medium of claim 1, further comprising a barrier layer formed over the multi-layered magnetic stack.

6. The magnetic medium of claim 1, further comprising a magnetic underlayer formed between the seed layer of titanium and the substrate.

7. The magnetic medium of claim 1, wherein the substrate comprises a plastic substrate.

8. The magnetic medium of claim 1, wherein the multi-layered magnetic stack comprises pairs of alternating layers of platinum and cobalt consisting essentially of face centered cubic (FCC) crystallites in a (111) orientation.

9. The magnetic medium of claim 1, wherein the medium exhibits a coercivity between approximately 3948 and 10,000 Oersteds.

10. The magnetic medium of claim 1, wherein the medium exhibits a coercivity greater than approximately 7000 Oersteds.

11. The magnetic medium of claim 1, wherein the medium exhibits a hysteresis curve having a switching fields distribution (SFD) less than 30 percent of its coercivity.

12. The magnetic medium of claim 1, wherein the medium exhibits an anisotropy greater than $4.0 \times 10^6$ ergs/$cm^3$.

13. The magnetic medium of claim 1, wherein the substrate comprises a polycarbonate substrate.

14. The magnetic medium of claim 1, wherein the multi-layered magnetic stack comprises alternating layers of platinum and cobalt.

15. The magnetic medium of claim 14, wherein the layers of platinum in the multi-layered stack define a thickness between approximately 0.5 and 2.5 nanometers, and wherein the layers of cobalt in the multi-layered stack define a thickness between approximately 0.15 and 1.0 nanometers.

16. The magnetic medium of claim 15, wherein a number of pairs of alternating layers of platinum and cobalt is between 5 and 50 inclusive.

17. The magnetic medium of claim 1, wherein the multi-layered magnetic stack comprises pairs of alternating layers of palladium and cobalt.

18. The magnetic medium of claim 17, wherein the layers of palladium in the multi-layered stack define a thickness between approximately 0.3 and 1.8 nanometers, and wherein the layers of cobalt in die multi-layered stack define a thickness between approximately 0.15 and 1.0 nanometers.

19. The magnetic medium of claim 17, wherein a number of pairs of alternating layers of palladium and cobalt in the multi-layered stack is between 5 and 50 inclusive.

20. A magnetic medium comprising:
a substrate;
a layer of titanium formed over the substrate, wherein the layer of titanium comprises hexagonal close pack (HCP) crystallites in a (0001) orientation and forms a seed layer;
a layer of platinum formed over the layer of titanium wherein the layer of platinum comprises face centered cubic (FCC) crystallites in a (111) orientation and forms another seed layer; and
a multi-layered magnetic stack formed over the layer of platinum comprising pairs of alternating layers of platinum and cobalt, wherein each of the pairs defines a period of the multi-layered magnetic stack, and wherein the layers of platinum in the multi-layered stack define a thickness between approximately 0.5 and 2.5 nanometers, wherein the layers of cobalt in the multi-layered stack define a thickness between approximately 0.15 and 1.0 nanometers, wherein the medium exhibits an anisotropy greater than $4.0 \times 10^6$ ergs/$cm^3$ and wherein the medium exhibits a coercivity greater than or equal to approximately 3948 Oersteds and a hysteresis curve having a nucleation field greater than 80 percent of its coercivity.

21. The medium of claim 20, wherein the substrate comprises a plastic substrate.

22. A magnetic storage device comprising:
a magnetic storage medium;
a head to detect magnetic domains on the medium;
a controller that controls a position of the head relative to the medium; and
a signal processor that interprets detected magnetic domains,
wherein the magnetic storage medium includes a substrate, a seed layer of titanium formed over the substrate, the seed layer of titanium including hexagonal close pack (HCP) crystallites in a (0001) orientation, a seed layer of platinum formed over the seed layer of titanium, the seed layer of platinum including face centered cubic (FCC) crystallites in a (111) orientation, and a multi-layered magnetic stack formed over the seed layer of platinum, wherein the multi-layered magnetic stack includes a plurality of layers each having a thickness of less than or equal to approximately 3 nanometers, and wherein the multi-layered magnetic stack comprises pairs of alternating layers including face centered cubic (FCC) crystallites in a (111) orientation, wherein each of the pairs defines a period of the multi-layered magnetic stack, and wherein the medium exhibits a coercivity greater than or equal to approximately 3948 Oersteds and a hysteresis curve having a nucleation field greater then 80 percent of its coercivity.

23. The magnetic storage device of claim 22, wherein the device comprises a device selected from the following group: a magnetic tape drive, a magnetic disk drive, a hard disk drive, a floppy disk drive, and a magnetic tape cartridge drive.

* * * * *